United States Patent
Fan et al.

(10) Patent No.: US 12,508,777 B2
(45) Date of Patent: Dec. 30, 2025

(54) TAPE PASTING MECHANISM WITH MULTIPLE FUNCTIONS OF CLUTCH-TYPE SYNCHRONOUS PUNCHING, TAPE PASTING AND CUTTING

(71) Applicant: SHENZHEN KATOP AUTOMATION TECHNOLOGY CO., LTD., Guangdong (CN)

(72) Inventors: ZhenHua Fan, Guangdong (CN); LiGen Xing, Guangdong (CN); ShengBin Zhou, Guangdong (CN)

(73) Assignee: SHENZHEN KATOP AUTOMATION TECHNOLOGY CO., LTD., Guangdong (CN)

( * ) Notice: Subject to any disclaimer, the term of this patent is extended or adjusted under 35 U.S.C. 154(b) by 804 days.

(21) Appl. No.: 17/793,236

(22) PCT Filed: Jan. 4, 2021

(86) PCT No.: PCT/CN2021/070118
§ 371 (c)(1),
(2) Date: Jul. 15, 2022

(87) PCT Pub. No.: WO2021/143556
PCT Pub. Date: Jul. 22, 2021

(65) Prior Publication Data
US 2024/0173926 A1    May 30, 2024

(30) Foreign Application Priority Data
Jan. 17, 2020   (CN) .......................... 202010052340.4

(51) Int. Cl.
*B29C 65/00*    (2006.01)
*B26D 5/20*    (2006.01)
(Continued)

(52) U.S. Cl.
CPC ............ *B29C 66/0326* (2013.01); *B26D 5/20* (2013.01); *B26D 9/00* (2013.01); *B26F 1/14* (2013.01);
(Continued)

(58) Field of Classification Search
None
See application file for complete search history.

(56) References Cited

U.S. PATENT DOCUMENTS

2018/0085864 A1    3/2018  Wilhelm et al.
2022/0106143 A1*   4/2022  Fan ................... B65H 35/0086

FOREIGN PATENT DOCUMENTS

CN    102061607 A    5/2011
CN    102501268 A    6/2012
(Continued)

OTHER PUBLICATIONS

CN102554622A_machine_translation (Year: 2012).*
(Continued)

*Primary Examiner* — Michael N Orlando
*Assistant Examiner* — Abhishek A Patwardhan
(74) *Attorney, Agent, or Firm* — Michael Best & Friedrich LLP

(57) ABSTRACT

Provided is a tape pasting mechanism with multiple functions of clutch-type synchronous punching, tape pasting and cutting which belongs to a tape pasting device for foil and includes a linear drive module, a clutch module, and following modules that are moved by the linear drive module: a punching module, a tape pasting module and a cutting module. The punching module includes a punching needle. The clutch module includes a punching bottom die that mates with the punching needle for punching. The clutch module is movable on the linear drive module together with the punching module.

7 Claims, 5 Drawing Sheets

(51) Int. Cl.
  *B26D 9/00*   (2006.01)
  *B26F 1/14*   (2006.01)
  *B26F 1/24*   (2006.01)
  *B29C 65/74*  (2006.01)

(52) U.S. Cl.
  CPC ............ *B26F 1/24* (2013.01); *B29C 65/7455* (2013.01); *B29C 65/7457* (2013.01); *B29C 66/742* (2013.01)

(56) References Cited

FOREIGN PATENT DOCUMENTS

| CN | 102554622 A | 7/2012 |
|---|---|---|
| CN | 206936142 U | 1/2018 |
| CN | 108544590 A | 9/2018 |
| CN | 110239989 A | 9/2019 |
| CN | 111113930 A | 5/2020 |
| CN | 211942172 U | 11/2020 |
| JP | H08204094 A | 8/1996 |
| JP | 2011161601 A | 8/2011 |
| JP | 2022536954 A | 8/2022 |
| WO | 2000040380 A1 | 7/2000 |

OTHER PUBLICATIONS

PCT/CN2021/070118 International Search Report dated Mar. 26, 2021.
Korean Intellectual Property Office Notice of Allowance for Application No. 202010052340.4 dated Apr. 26, 2024 (4 pages including English translation).
Chinese Patent Office Action for Application No. 202010052340.4 dated Nov. 11, 2024 (11 pages including English machine translation).
Japanese Patent Office Decision to Grant for Application No. 2022543502 dated Jul. 18, 2023 (5 pages including English machine translation).
Chinese Patent Office Action for Application No. 202010052340.4 dated Jun. 27, 2025 (14 pages including English translation).

\* cited by examiner

TAPE PASTING MECHANISM WITH MULTIPLE FUNCTIONS OF CLUTCH-TYPE SYNCHRONOUS PUNCHING, TAPE PASTING AND CUTTING

CROSS-REFERENCE TO RELATED APPLICATIONS

This is a National Stage Application filed under 35 U.S.C. 371 based on International Patent Application No. PCT/CN2021/070118, filed on Jan. 4, 2021, which claims priority to Chinese Patent Application No. 202010052340.4 filed with the China National Intellectual Property Administration (CNIPA) on Jan. 17, 2020, the contents of which are incorporated herein by reference in their entireties.

TECHNICAL FIELD

The present disclosure relates to a tape pasting device for foil and, in particular, to a tape pasting mechanism with multiple functions of clutch-type synchronous punching, tape pasting and cutting.

BACKGROUND

With the improvement of the automation degree of modern factories, various devices gradually become unmanned and intelligent. The field to which the present disclosure relates links such as the winding of the tape and the splicing of bands after the winding of a coater. The links such as the winding of the tape and the splicing of bands generally require manual operation and shutdown. However, according to the proficiency of different personnel, the auxiliary time fluctuates greatly and is difficult to control accurately: moreover, the strength and quality of the spliced bands are inconsistent, affecting the efficient operation of the device.

An existing Chinese invention patent with publication number CN110239989A provides a multifunctional automatic punching, laminating, tape preparation and cutting device and method for a tail edge of a coil. The device includes a mechanical arm and a punching, tape preparation and cutting mechanism, an end of the mechanical arm is provided with the punching, tape preparation and cutting mechanism, the other end of the mechanical arm is rotatably connected to a rack, and the mechanical arm is driven to rotate by a motor, a cylinder or an oil cylinder.

On the one hand, in the preceding scheme, an integral punching die is used for punching the foil integrally. Since the length of the integral punching die increases to a certain dimension with the width of the foil, it is difficult to ensure the flatness and straightness of the integral punching die so that a mismatch with a punching bottom die occurs during downward punching, causing issues such as damages to a punching needle for punching.

On the other hand, due to the separation of the punching needle from a punching hole, when punching is performed again, issues of inaccurate positioning of individual holes, unilateral wear of the punching needle, and even damages to a cutting edge easily occur due to a large number of holes and a cumulative error of the hole spacing so that costs of subsequent usage and maintenance increase. Therefore, improvement needs to be made.

SUMMARY

To overcome deficiencies in the existing art, the present disclosure provides a tape pasting mechanism with multiple functions of clutch-type synchronous punching, tape pasting and cutting to solve the preceding technical issues.

To solve the preceding technical issues, the present disclosure adopts technical scheme described below:

A tape pasting mechanism with multiple functions of clutch-type synchronous punching, tape pasting and cutting includes a linear drive module, a clutch module, and following modules that are moved by the linear drive module: a punching module, a tape pasting module and a cutting module, where the punching module includes a punching needle, the clutch module includes a punching bottom die that mates with the punching needle for punching, and the clutch module is movable on the linear drive module together with the punching module.

According to the preceding technical scheme, under the drive of the punching module, the punching needle repeatedly punches into and out of the punching bottom die, and the linear drive module with a stepping function is used for driving the punching module to move in a stepping manner so that a row of punching holes are formed on the foil, and integral punching is changed to one-by-one punching, thereby solving the following issue: the flatness and straightness of an integral punching die is difficult to be ensured, a mismatch with the punching bottom die occurs during downward punching, and the punching needle for punching is damaged.

In an embodiment, the punching module further includes a positioning plate, and the clutch module further includes a clutch guide column that is inserted into and mates with the positioning plate and a clutch cylinder that drives the clutch guide column.

According to the preceding technical scheme, on the one hand, the clutch module is movable on the linear drive module together with the punching module so that the punching needle and the punching module are kept relatively stationary, and on the other hand, coaxiality between the punching needle and the punching module can be improved.

In an embodiment, a convex cone is provided at an end of the clutch guide column, and a concave cone groove corresponding to the convex cone is provided on the positioning plate.

According to the preceding technical scheme, the positioning plate is made of hard metal material which has considerable mechanism rigidity, and has an anti-deformation support bearing to offset the thrust of the clutch cylinder, thereby further improving the coaxiality between the punching needle and the punching bottom die to the accuracy of 0.01 mm.

In an embodiment, the punching module further includes a driving cylinder and a processing table connected to an output shaft of the driving cylinder, the cutting module includes a cutter, and the punching needle and the cutter are both disposed on the processing table.

In an embodiment, the driving cylinder has a primary stroke and a secondary stroke, and a distance between a bottom end of the cutter and foil is less than a distance between a bottom end of the punching needle and the foil.

According to the preceding technical scheme, when the driving cylinder starts the secondary stroke, both the cutter and the punching needle can be in contact with the foil at the same time, which is a punching process at this time: and when the driving cylinder starts the primary stroke, the cutter can be in contact with and cut the foil, and a certain interval exists between the punching needle and the foil, which is a cutting process at this time. After the punching process, a row of punching holes are formed on the foil and the cutter forms a row of incisions in advance. In the cutting process, the cutter is used for cutting the row of incisions to cut off the remaining material.

In an embodiment, the punching module further includes an elastic pre-pressing plate, a guide post and a spring, where an end of the guide post is connected to the elastic pre-pressing plate and another end of the guide post is slidably connected to the processing table, and the spring is sleeved outside the guide post.

According to the preceding technical scheme, the local foil is simultaneously compressed during punching so that a flat region is formed, and the punching burrs of the foil are reduced.

In an embodiment, the tape pasting module includes a tape pasting mounting plate, an unwinding mechanism, a winding mechanism, a tape pasting approach plate, a tape pasting roller and a tape cutting assembly, and both the punching module and the cutting module are mounted on the tape pasting mounting plate.

According to the preceding technical scheme, the linear drive module only needs to drive the tape pasting module to drive the punching module and the cutting module at the same time.

In an embodiment, the clutch module further includes a punching waste box disposed below the punching bottom die.

According to the preceding technical scheme, the waste material after punching falls into the punching waste box, and the punching waste box can accommodate the punching waste material for at least one shift or one day.

In an embodiment, a control method of a punching function of the punching module and a cutting function of the cutting module includes that: when the driving cylinder starts the primary stroke, only the cutting function works, that is, the cutter falls and is movable left and right with the linear drive module to cut the foil: and when the driving cylinder starts the secondary stroke, only the punching function works, the linear drive module is not movable, and after the secondary stroke is reset, the linear drive module is movable.

The present disclosure has beneficial effects described below.

1. The integral punching die is improved to a clutch-type punching die, and the original integral punching process is improved to one-by-one punching.

2. The clutch module not only provides the punching bottom die so that the punching needle can complete the one-by-one punching process, but also provides the cooperation between the clutch guide column and the positioning plate to improve the fit between the punching needle and the punching bottom die so that the following issues can be avoided: due to the separation of the punching needle from the punching hole, when punching is performed again, issues of inaccurate positioning of individual holes, unilateral wear, and even damages to a cutting edge easily occur due to a large number of holes and a cumulative error of the hole spacing. In this manner, costs of subsequent usage and maintenance are reduced.

3. The punching module, the tape pasting module and the cutting module are combined into a whole large module so that the foil only needs to be fed once to complete three processes of punching, tape pasting and cutting, thereby greatly improving the efficiency.

4. A hole margin at a tail edge of the foil is determined by a distance between the punching needle and the cutter in the mechanism. This manner is more accurate than a manner in which punching is performed first and then feeding is performed to determine the hole margin.

BRIEF DESCRIPTION OF DRAWINGS

The present disclosure is further described below in conjunction with drawings and embodiments.

Figure 1:
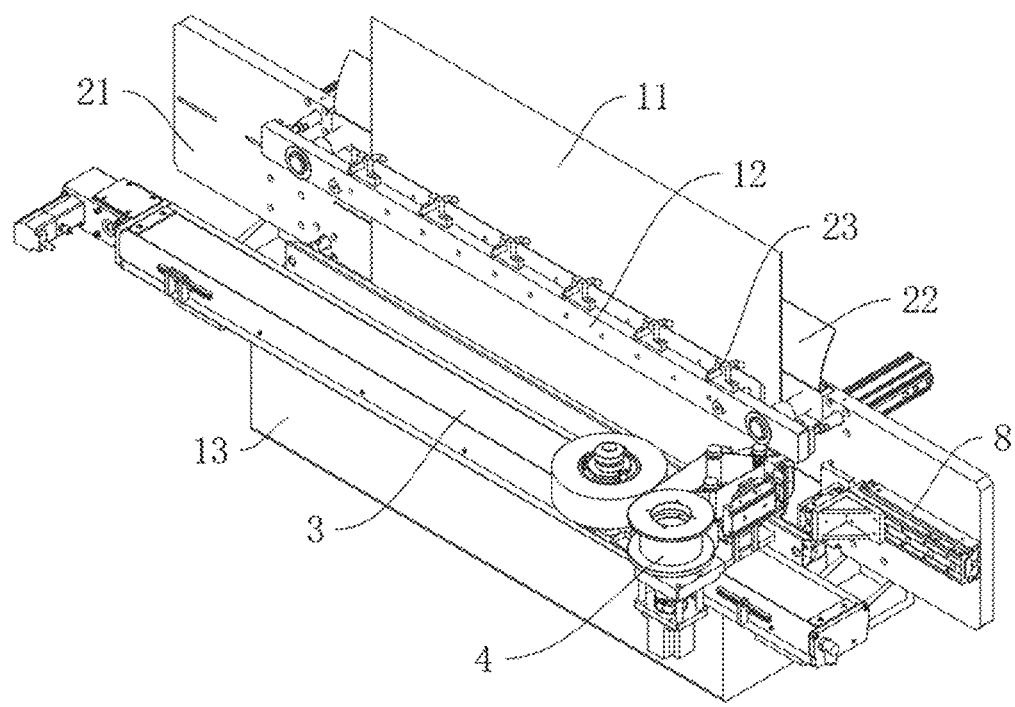
FIG. 1 is the structural view in the existing art.
Figure 2:
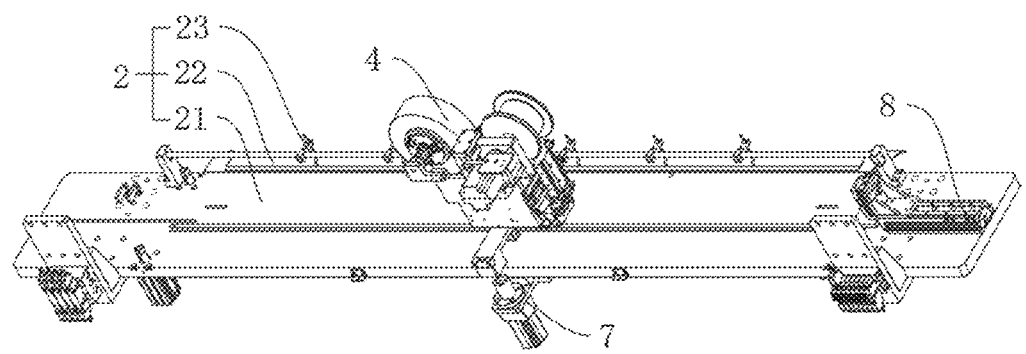
FIG. 2 is a structural view of a hidden linear drive module according to the present disclosure.
Figure 3:
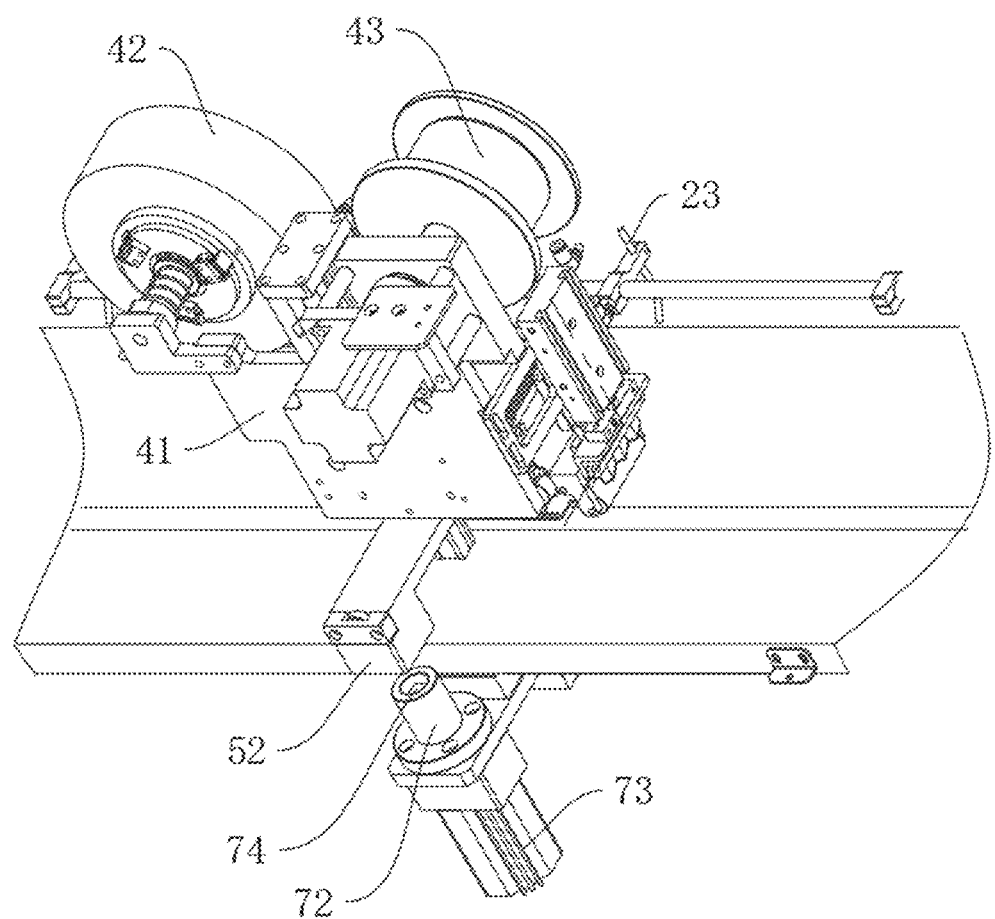
FIG. 3 is a partial schematic view of a tape pasting module and a clutch module in FIG. 2.
Figure 4:
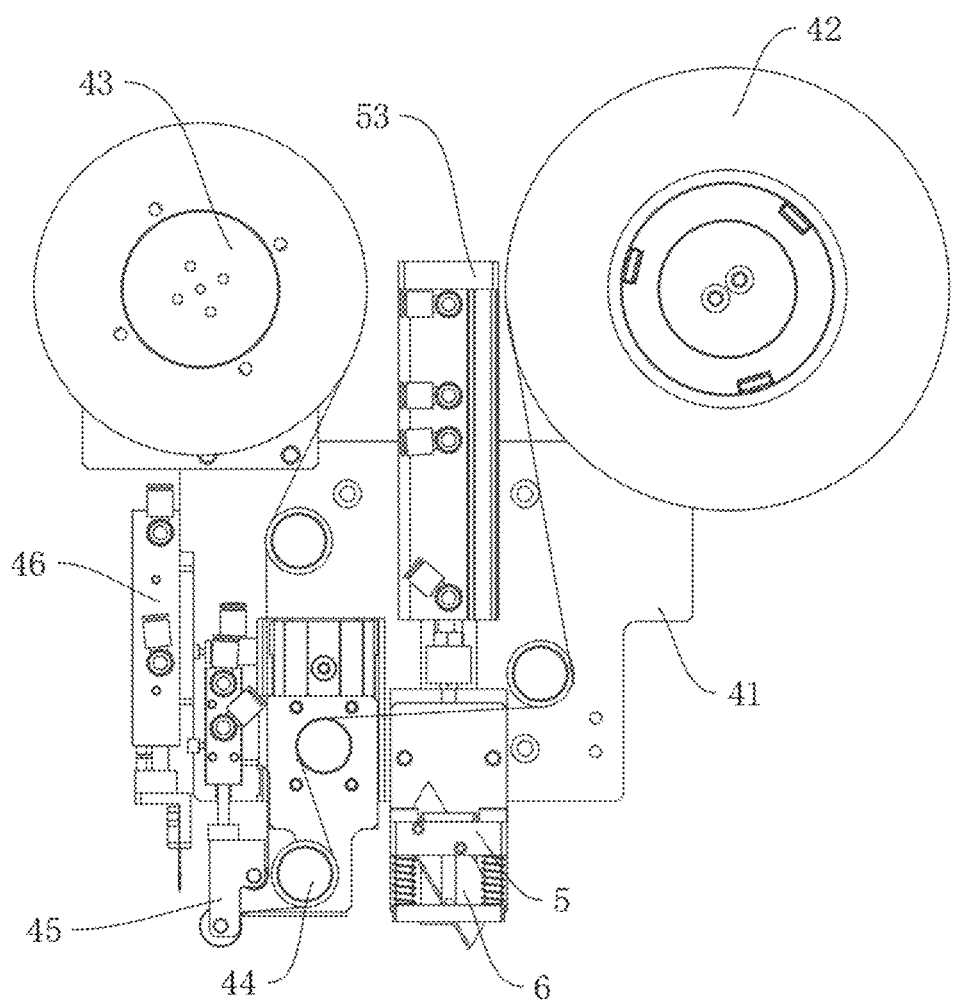
FIG. 4 is a plan view of a tape pasting module according to the present disclosure.
Figure 5:
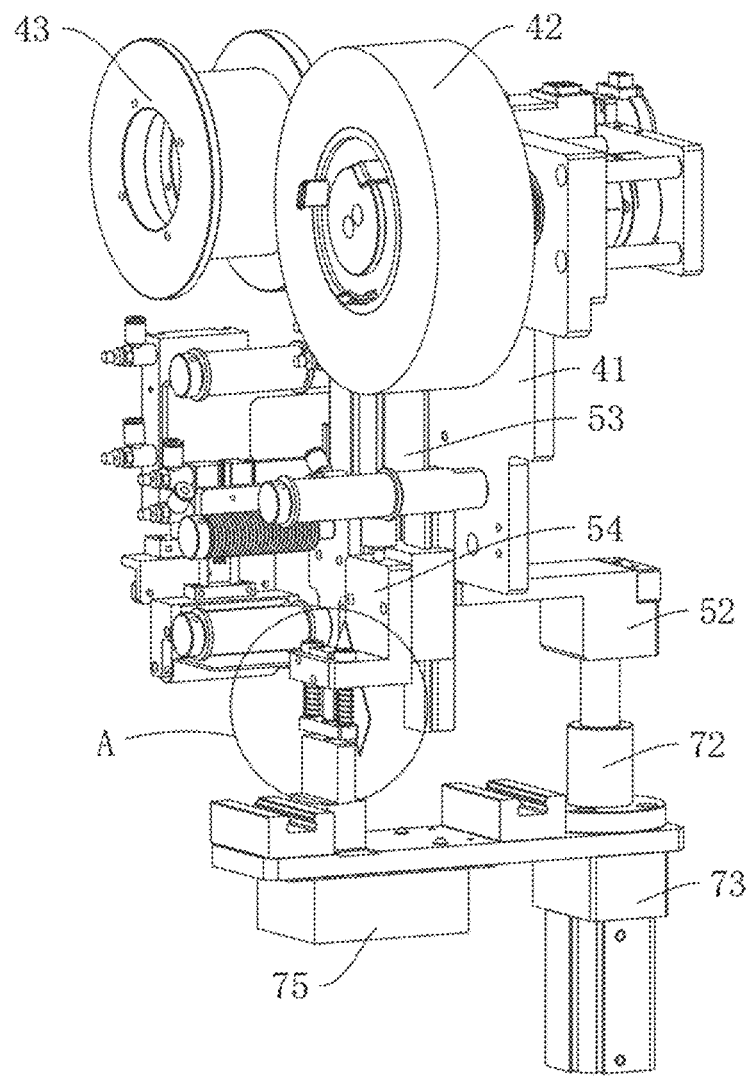
FIG. 5 is a structural view of a punching module and a cutting module according to the present disclosure.

REFERENCE LIST 11 foil
12 integral punching die
13 foil waste box
2 feeding guide module
21 bottom plate
22 guide plate
23 airflow guide assembly
3 linear drive module
4 tape pasting module
41 tape pasting mounting plate
42 unwinding mechanism
43 winding mechanism
44 tape pasting approach plate
45 tape pasting roller
46 tape cutting assembly
5 punching module
51 punching needle
52 positioning plate
53 driving cylinder
54 processing table
55 elastic pre-pressing plate
56 guide post
57 spring
6 cutting module
61 cutter
7 clutch module
71 punching bottom die
72 clutch guide column
73 clutch cylinder
74 convex cone
75 punching waste box
8 tape pressing module

DETAILED DESCRIPTION

A concept, a specific structure and technical effects of the present disclosure are clearly and completely described below in conjunction with the embodiments and drawings, so as to fully understand the object, feature and effects of the present disclosure. Apparently, the embodiments described herein are part, not all, of the embodiments of the present disclosure. Based on the embodiments of the present disclosure, other embodiments obtained by those skilled in the art on the premise that no creative work is done are within the scope of the present disclosure. In addition, all coupling/ connection relationships involved in the patent do not mean that components are directly connected, but refer to according to specific implementation, coupling accessories are added or reduced so as to compose a better coupling structure. Various technical features in the present disclosure can be combined interactively on the premise of not contradicting each other.

FIG. 1 shows an integral punching tape pasting mechanism in the existing art. As shown in FIG. 1, the integral punching tape pasting mechanism includes a bottom plate 21, foil 11, a guide plate 22, an airflow guide assembly 23, an integral punching die 12, a tape pressing module 8, a tape pasting module 4, a linear drive module 3, and a foil waste box 13.

In this technical scheme, a feeding mechanism (which does not belong to the content of the tape pasting mechanism and thus is not shown in FIG. 1) is used for sending the foil 11 to the bottom plate 21 and then to the bottom of the integral punching die 12 through the guide plate 22 and the airflow guide assembly 23. First, the integral punching is performed, a row of punching holes are formed on the foil 11, the tape pressing module 8 presses the end of a tape, and under the drive of the linear drive module 3, the tape pasting module 4 pastes the double-sided tape on the foil 11. When the tape pasting module 4 returns, the redundant foil 11 is cut off by a cutter 61 (not shown in FIG. 1), and the waste material falls into the foil waste box 13.

On the one hand, in the preceding scheme, an integral punching die is used for punching the foil integrally: Since the length of the integral punching die increases to a certain dimension with the width of the foil, it is difficult to ensure the flatness and straightness of the integral punching die so that a mismatch with a punching bottom die occurs during downward punching, causing issues such as damages to a punching needle for punching.

On the other hand, due to the separation of the punching needle from the punching hole, when punching is performed again, issues of inaccurate positioning of individual holes, unilateral wear of the punching needle, and even damages to a cutting edge easily occur due to a large number of holes and a cumulative error of the hole spacing so that costs of subsequent usage and maintenance increase.

To solve the preceding technical issues, the present disclosure provides a new type of tape pasting mechanism described below:

As shown in FIGS. 2 to 6, a tape pasting mechanism with multiple functions of clutch-type synchronous punching, tape pasting and cutting includes a feeding guide module 2, a linear drive module 3 (referring to FIG. 1), a tape pasting module 4, a punching module 5, a cutting module 6, a clutch module 7, and a tape pressing module 8.

The feeding guide module 2 includes a bottom plate 21, a guide plate 22, and an airflow guide assembly 23, and through a place between the guide plate 22 and the airflow guide assembly 23, the foil 11 is sent to the bottom of the tape pasting module 4 for processing.

The tape pasting module 4 includes a tape pasting mounting plate 41, an unwinding mechanism 42, a winding mechanism 43, a tape pasting approach plate 44, a tape pasting roller 45, and a tape cutting assembly 46.

Both the punching module 5 and the cutting module 6 are mounted on the tape pasting mounting plate 41 so that the linear drive module 3 only needs to drive the tape pasting module 4 to drive the punching module 5 and the cutting module 6 at the same time.

The punching module 5 includes a punching needle 51, a positioning plate 52 and a driving cylinder 53. An output shaft of the driving cylinder 53 is connected to a processing table 54. The driving cylinder 53 has a primary stroke and a secondary stroke. A distance between a bottom end of the cutter 61 and the foil 11 is less than a distance between a bottom end of the punching needle 51 and the foil 11. When the driving cylinder 53 starts the secondary stroke, both the cutter 61 and the punching needle 51 can be in contact with the foil 11 at the same time, which is a punching process at this time. When the driving cylinder 53 starts the primary stroke, the cutter 61 can be in contact with and cut the foil 11, and a certain interval exists between the punching needle 51 and the foil 11, which is a cutting process at this time. After the punching process, a row of punching holes are formed on the foil 11 and the cutter 61 forms a row of incisions in advance. In the cutting process, the cutter 61 is used for cutting the row of incisions to cut off the remaining material.

The cutting module 6 includes the cutter 61, and both the punching needle 51 and the cutter 61 are disposed on the processing table 54.

To implement the one-by-one punching manner, the clutch module 7 is slidably connected under the bottom plate 21 along the same direction as the linear drive module 3.

The clutch module 7 includes a punching bottom die 71 that mates with the punching needle 51 for punching, a clutch guide column 72 that is inserted into and mates with the positioning plate 52, a clutch cylinder 73 that drives the clutch guide column 72, and a punching waste box 75 disposed below the punching bottom die 71.

The clutch cylinder 73 drives the clutch guide column 72 to be inserted into the positioning plate 52 so that the clutch module 7 moves on the linear drive module 3 together with the punching module 5. The clutch cylinder 73 drives the clutch guide column 72 to be separated from the positioning plate 52 so that the clutch module 7 does not move together with the punching module 5. To sum up, the clutch module 7 is movable on the linear drive module 3 together with the punching module 5.

A control method of a punching function of the punching module 5 and a cutting function of the cutting module 6 includes that: when the driving cylinder 53 starts the primary stroke, only the cutting function works, that is, the cutter 61 falls and is movable left and right with the linear drive module to cut the foil; and when the driving cylinder 53 starts the secondary stroke, only the punching function works, the linear drive module 3 is not movable, and after the secondary stroke is reset, the linear drive module 3 is movable.

A specific working principle includes detailed processes described below.

1. A tape pasting process is described below: The feeding guide module 2 sends the foil 11 sent by the feeding mechanism to a lower part of the tape pasting module 4 through a place between the guide plate 22 and the airflow guide assembly 23, the tape pasting approach plate 44 descends so that the end of the tape is pasted to the foil 11, the tape pressing assembly presses the head of the tape, the tape pasting roller 45 descends, and then the tape pasting module is driven by the linear drive module 3 to paste the double-sided tape on the foil 11. During this process, the tape pasting roller 45 continues to press the tape and the foil 11 to ensure a tight fit.

2. A punching process is described below: The punching module 5 is arranged behind the tape pasting module 4, the linear drive module 3 is set to a stepping state, a stepping distance (that is, a distance between two punching holes) is set, the driving cylinder 53 starts the secondary stroke, and the punching needle 51 is driven into the punching bottom die 71 so that holes are punched at set positions of the foil 11, and the waste material after punching falls into the punching waste box 75. The punching waste box 75 can accommodate the punching waste material for at least one shift or one day. The preceding actions are repeatedly performed to form a row of punching holes on the foil 11. At this time, one punching process is completed, and the tape pasting module 4, the punching module 5, the cutting module 6 and the clutch module 7 move to the other end of the linear drive module 3.

3. A cutting process is described below: The driving cylinder 53 starts the primary stroke. At this time, the punching hole is not in contact with the foil 11 while the cutter 61 can descend to a lower surface of the foil 11, and the linear drive module 3 drives the tape pasting module 4 in a reverse direction and drives the cutting module 6 to move together so that the cutter 61 penetrates through and cuts the foil 11, and the redundant material of the foil 11 is cut off and fall into the foil waste box 13.

In the preceding three processes, the clutch cylinder 73 continuously drives the clutch guide column to closely fit the positioning plate 52, thereby ensuring that the clutch module 7 and the tape pasting module 4 are driven by the linear drive module 3 together to move left and right. In addition, it is more important to ensure the coaxiality of the punching needle 51 and the punching bottom die 71. In this manner, smooth punching can be achieved when the punching needle 51 and the punching bottom die 71 are at any position of an entire stroke of the linear drive module 3, that is, it is ensured that the punching needle 51 and the punching bottom die 71 are relatively stationary; so as to avoid damages to the punching needle 51 caused by the misalignment.

A convex cone 74 is provided at an end of the clutch guide column 72, and a concave cone groove (not shown in the figures) corresponding to the convex cone 74 is provided on the positioning plate 52. The positioning plate 52 is made of hard metal material which has considerable mechanism rigidity, and has an anti-deformation support bearing to offset the thrust of the clutch cylinder 73, thereby further improving the coaxiality between the punching needle 51 and the punching bottom die 71 to the accuracy of 0.01 mm.

After the cutting process is completed, the tape pasting module 4 returns to the initial position. At this time, the clutch cylinder 73 drives the clutch guide column 72 to retract so that the clutch guide column 72 is separated from the positioning plate 52, thereby allowing the waste material of the foil 11 to fall into a channel of the foil waste box 13. Before the next time of starting punching and tape pasting, the clutch cylinder 73 drives the clutch guide column 72 to closely fit the positioning plate 52 again.

Figure 6:
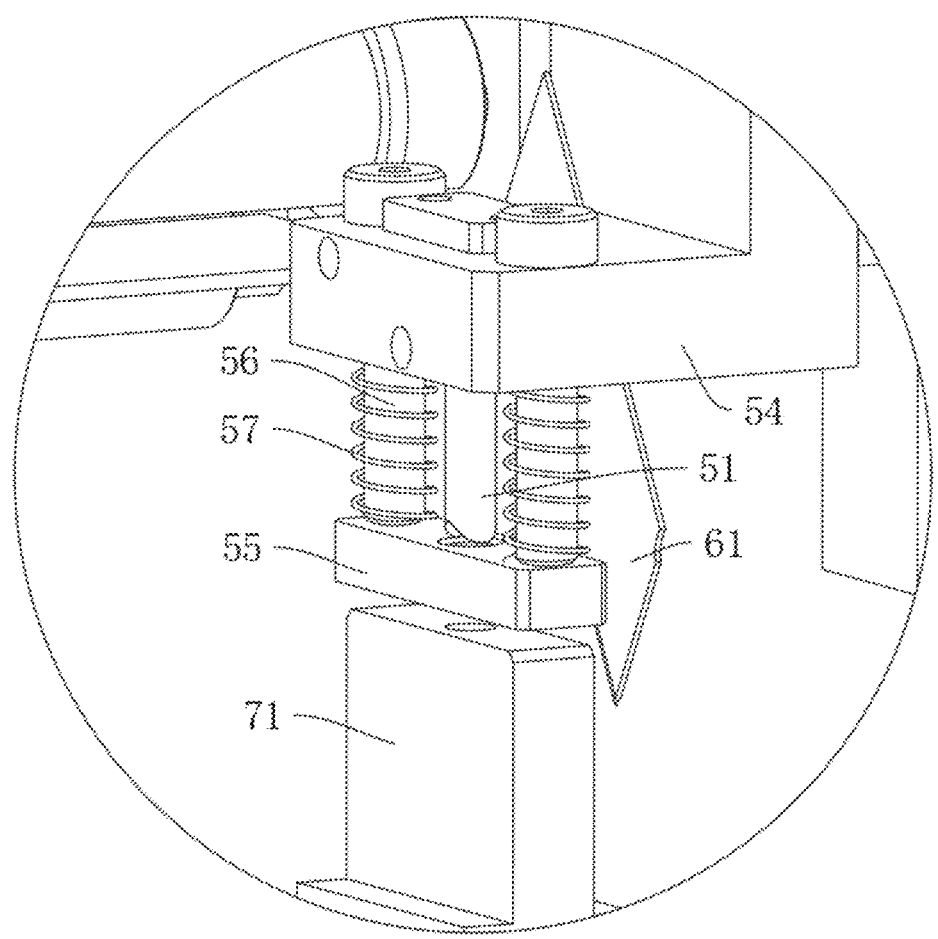
FIG. 6 is a partial enlarged view of part A of FIG. 5.

A positional relationship between the punching needle 51 and the cutter 61 is shown in FIG. 6, the distance between the bottom end of the cutter 61 and the foil 11 is less than the distance between the bottom end of the punching needle 51 and the foil 11, the foil 11 on the side of the punching needle 51 is the processed foil 11, and the foil 11 on the side of the cutter 61 is the redundant material of the foil 11 after cutting.

To further improve the flatness of the foil 11 during punching, the punching module 5 further includes an elastic pre-pressing plate 55, a guide post 56 and a spring 57, where an end of the guide post 56 is connected to the elastic pre-pressing plate 55 and the other end of the guide post 56 is slidably connected to the processing table 54, and the spring 57 is sleeved outside the guide post 56. The local foil 11 is simultaneously compressed during punching so that a flat region is formed, and the punching burrs of the foil 11 are reduced.

The above is a specific description of preferred embodiments of the present disclosure. However, the present disclosure is not limited to the embodiments. Various equivalent modifications or alterations may further be made by those skilled in the art without departing from the spirit of the present disclosure. These equivalent modifications or alterations fall within the scope of the claims in the present application.

What is claimed is:

1. A tape pasting mechanism with multiple functions of clutch-type synchronous punching, tape pasting and cutting, comprising: a linear drive module, a clutch module, and following modules that are moved by the linear drive module: a punching module, a tape pasting module and a cutting module, wherein the punching module comprises a punching needle, the clutch module comprises a punching bottom die that mates with the punching needle for punching, and the clutch module is movable on the linear drive module together with the punching module;

wherein the punching module further comprises a driving cylinder and a processing table connected to an output shaft of the driving cylinder, the cutting module comprises a cutter, and the punching needle and the cutter are both disposed on the processing table; and the driving cylinder has a primary stroke and a secondary stroke, and a distance between a bottom end of the cutter and foil is less than a distance between a bottom end of the punching needle and the foil.

2. The tape pasting mechanism of claim 1, wherein the punching module further comprises a positioning plate, and the clutch module further comprises a clutch guide column that is inserted into and mates with the positioning plate and a clutch cylinder that drives the clutch guide column.

3. The tape pasting mechanism of claim 2, wherein a convex cone is provided at an end of the clutch guide column, and a concave cone groove corresponding to the convex cone is provided on the positioning plate.

4. The tape pasting mechanism of claim 1, wherein the punching module further comprises an elastic pre-pressing plate, a guide post and a spring, wherein an end of the guide post is connected to the elastic pre-pressing plate and another end of the guide post is slidably connected to the processing table, and the spring is sleeved outside the guide post.

5. The tape pasting mechanism of claim 1, wherein the tape pasting module comprises a tape pasting mounting plate, an unwinding mechanism, a winding mechanism, a tape pasting approach plate, a tape pasting roller and a tape cutting assembly, and both the punching module and the cutting module are mounted on the tape pasting mounting plate.

6. The tape pasting mechanism of claim 1, wherein the clutch module further comprises a punching waste box disposed below the punching bottom die.

7. The tape pasting mechanism of claim 1, wherein a control method of a punching function of the punching module and a cutting function of the cutting module includes that: when the driving cylinder starts the primary stroke, only the cutting function works, the cutter falls and is movable left and right with the linear drive module to cut the foil; and when the driving cylinder starts the secondary stroke, only the punching function works, the linear drive module is not movable, and after the secondary stroke is reset, the linear drive module is movable.

* * * * *